Patented Aug. 28, 1951

2,565,654

UNITED STATES PATENT OFFICE 2,565,654

VEGETABLE OIL-HYDROCARBON OIL-CARBONYL COMPOUNDS

Edward M. Geiser, Downers Grove, Ill., assignor to Universal Oil Products Company, Chicago, Ill., a corporation of Delaware No Drawing. Application March 17, 1948, Serial No. 15,507

13 Claims. (Cl. 260—23.5)

This invention relates to a process for the production of materials possessing resinous and/or elastomeric properties, depending upon the specific types of reactants and reaction conditions selected in the preparation thereof. More specifically, the invention concerns the production of resinous or rubber-like products by the condensation of a cobodied fatty acid ester drying oil and a particular type of hydrocarbon drying oil with a secondary reactant characterized as an organic compound containing a carbonyl radical, said reactant being selected from the group consisting of the aldehydes and ketones.

By means of the present reaction and utilizing the reactants herein specified, a process is presented, the products of which may be liquid, resinous, or elastomeric, depending upon the choice of reactants and reaction conditions utilized therefor. Thus, the product may be a liquid, somewhat more viscous drying oil in which the drying speed of the cobodied drying oil component is merely altered or the film produced therefrom on drying made more elastic and tough than the original drying oils would form. The mechanism of the reaction believed to be involved in the formation of the present products is the condensation of a carbonyl compound through the carbonyl oxygen atom with one or more active hydrogen atoms contained in the cobodied drying oil reactant molecules to thereby form water as a by-product of the reaction and the resinous or elastomeric material herein specified. Since the carbonyl oxygen atom is capable of condensing with two hydrogen atoms to yield a molecule of water and the hydrogen atoms are capable of being supplied either both from a single molecule of the cobodied drying oils or one atom each from two molecules of drying oil, it is possible to obtain either a simple condensation reaction between single molecules of each of the reactants producing a product having a relatively low molecular weight or an intercondensation between two or more drying oil molecules with one or more molecules of the carbonyl reactant yielding condensate molecules of high molecular weight and of relatively complex structure having different properties. The present reaction mechanism, referred to collectively as a condensation type reaction, may also involve continued copolymerization between the unsaturated hydrocarbon and fatty acid ester drying oil components producing products having rubber-like or elastomeric properties. Depending upon reaction conditions and the reactants selected for the reaction, as well as the proportion of the reactants, considerable latitude is permitted in the properties of the resulting condensation product. The solubility of the product in various solvents and its behavior relative to other materials with which it may be compounded may also be varied almost at will by proper selection of the above factors affecting its properties. Further variations of the properties of the product is obtained by utilizing reactants containing various radicals other than those reactive groups involved in the condensation reaction, typical examples of which include such radicals as halogen, carboxyl, hydroxyl, and amino radicals. One of the primary objectives, therefore, of the present invention is to provide a process for the production of resinous materials which may be varied in their physical properties from hard, tough resinous products to elastomeric, fluid or highly viscous fluid derivatives of a cobodied drying oil mixture.

Another object of the invention is to modify the drying properties of a cobodied mixture of drying oils, to alter the speed of drying thereof and to modify the properties of the film obtained on exposing the oil to atmospheric oxygen.

A further object of the present invention is to provide a resinous or elastomeric condensation product of a carbonyl compound and a cobodied mixture of fatty acid ester and hydrocarbon types of drying oils which is compatible with selective solvents or the components of selected compositions, such as coating compositions.

Still another object of the invention is to provide a process for the production of resinous and elastomeric materials containing residual unsaturation which renders said products amenable to further oxidation and polymerization when exposed to atmospheric oxygen and especially when compounded with drying oils to provide coating compositions.

In one of its embodiments, the invention comprises cobodying an unsaturated fatty acid ester drying oil with a hydrocarbon type drying oil containing polyolefinic unsaturation in which at least some of the unsaturated bonds are in conjugated relationship with each other and further condensing the mixture of cobodied drying oils with a carbonyl compound selected from the group consisting of the aldehydes and ketones.

A more specific embodiment of the invention concerns a method of producing an elastomeric material by the process which comprises cobodying an unsaturated fatty acid glyceride drying oil with a drying oil of the unsaturated hydrocarbon type containing conjugated as well as non-conjugated unsaturation having a polyolefinic cyclic structure and prepared by the decomposition of the catalyst-hydrocarbon complexes contained in certain conjunct polymerization catalyst sludges and thereafter, and in the presence of an acid-acting condensation catalyst, at a temperature of from about 25° to about 200° C., effecting the chemical condensation of said cobodied drying oils with a low molecular weight carbonyl compound containing fewer than 6 carbon atoms per molecule and selected from the group consisting of the aldehydes and ketones, removing water of condensation from the reaction mixture and recovering said elastomeric material therefrom.

Other objects and embodiments involved in the present process will be referred to in greater detail in the following further description of the invention.

The primary starting material charged to the present process and herein specified as a cobodied mixture of an unsaturated fatty acid ester and an unsaturated hydrocarbon type drying oil is prepared in a preliminary stage of the process prior to the condensation of the same with the carbonyl reactant. The unsaturated fatty acid ester drying oils occur naturally as fatty acid glycerides recovered from various animal, vegetable, and marine sources and may be charged to the cobodying reaction as received or the glycerides may be modified for the purposes of the present process by replacing the glyceride ester linkage with other types of alcohols such as ethanol, the polyhydroxy glycols such as ethylene glycol, pentaerythritol, sorbitol, and the like or by the alkanolamines, represented for example, by the mono- and polyethanolamines. Since cobodying is essentially a copolymerization reaction between the unsaturated drying oils and involves the olefinic linkages therein, the oils herein specified must contain at least one unsaturated bond per molecule in order to undergo copolymerization. Included among the unsaturated fatty acid ester drying oils utilizable in the preliminary cobodying reaction are the drying and semi-drying classes containing conjugated and/or non-conjugated olefinic double bonds in the molecular structure of the oil. Of these, tung oil, linseed oil (either raw or boiled linseed oil), dehydrated castor oil, oiticia oil, perilla oil, olive oil, cottonseed oil, coconut oil, soy-bean oil, hemp-seed oil, poppy-seed oil, safflower oil, walnut oil, etc. are representative oils of the glyceride ester type utilizable herein. Certain members of the above series containing conjugated unsaturation, such as tung oil, oiticia oil and dehydrated castor oil are especially preferred herein when the object of the process is the production of an elastomeric condensation product or a product having further ability to dry on exposure to air. It is believed that the numerous unsaturated bonds contained in the latter oils permit the same to undergo interpolymerization more readily and to a greater extent with the unsaturated hydrocarbon drying oil when the mixture of said oils is subjected to the cobodying phase of the process. The fatty acid esters, furthermore, contained in the above oils may be hydrolyzed and the fatty acids liberated by hydrolysis may be recovered and also utilized as an unsaturated drying oil of the fatty acid series in the cobodying reaction. Oil-modified alkyd resins, oil-modified phenolics or other drying oil-modified resinous materials may likewise be treated as herein described, or such oil-modified resins may be prepared from drying oils or drying oil fatty acids previously treated by the present process.

The drying oils herein specified as the unsaturated hydrocarbon type drying oils which when cobodied with the unsaturated fatty acid ester drying oil comprises the primary starting material in the present process are hydrocarbons of unsaturated structure, generally of relatively high molecular weight, above about 250, and are usually of cyclic, non-aromatic structure containing conjugated as well as non-conjugated olefinic unsaturation. Hydrocarbons of the above type having drying oil properties may be prepared by any suitable manner known to the art or may be derived from various natural sources, as in the case of certain terpene fractions. One of the preferred sources of the hydrocarbon type drying oil which is especially suitable in the preliminary cobodying reaction because of its highly unsaturated structure in which the unsaturated bonds are in conjugated relationship with each other are the catalyst-hydrocarbon sludges recovered from certain hydrocarbon conversion processes utilizing catalysts capable of causing conjunct polymerization between the hydrocarbon reactants charged thereto. Typical of the catalysts capable of causing said conjunct polymerization are the various Friedel-Crafts metal halides such as anhydrous aluminum chloride and aluminum bromide and certain members of the mineral acids, such as concentrated sulfuric acid, substantially anhydrous hydrogen fluoride and boron trifluoride, as well as others generally known to the art. The above catalysts when contacted with a reactant, generally a non-aromatic hydrocarbon or hydrocarbon mixture, such as a mono- or polyolefin containing at least 3 carbon atoms per molecule or a branched chain paraffin at temperatures of from about −10° to about 200° C., preferably from about 30 to about 100° C. and at pressures sufficient to maintain the reactants in substantially liquid phase, cause conjunct polymerization among the hydrocarbon reactants, forming a sludge-like product containing catalyst-hydrocarbon addition complexes as a distinct reaction product of the process. Conjunct polymerization occurs in the mixture of catalyst and hydrocarbons by virtue of simultaneous polymerization, cyclization and hydrogen transfer reactions between the hydrocarbons forming thereby relatively saturated hydrocarbons as one product of the reaction and an accompanying product comprising high molecular weight polyolefinic, cyclic compounds, generally referred to in the art as conjunct polymers, containing from about 2 to about 4 double bonds per molecule in conjugated as well as non-conjugated relation to each other. The conjunct polymers usually having a molecular weight of from about 250 to about 450 and in some cases up to about 1000, become bound by weak chemical bonds to the conjunct polymerization catalyst to form the sludge hereinabove referred to and may be released therefrom by special methods of decomposition, as for example, by heating the sludge in the presence of a sludge decomposition catalyst or in the presence of certain inert hydrocarbon diluents; by hydrolyzing the chemical bonds, as for example, by adding the sludge to water or to a dilute caustic, or they may be recovered by extraction or displacement with a solvent or a more reactive material. It is not the purpose nor is it essential here to describe in detail the methods of producing sludge or recovering the hydrocarbon type of drying oil therefrom, but a description of the process relative to the use of substantially anhydrous hydrogen fluoride as conjunct polymerization catalyst (forming a conjunct polymer hydrocarbon product having a maximum degree of conjugated unsaturation as compared to other conjunct polymerization catalysts and a product possessing the most desirable characteristics of a hydrocarbon type drying oil) will be referred to with accompanying details in the examples hereinafter provided.

Cobodying of the above fatty acid ester and unsaturated hydrocarbon drying oils may be effected by heating the mixture of oils to a temperature of from about 200° to about 400° C. for a period of time determined by the desired viscosity of the product which increases as the reaction period is extended. For purposes of the present invention, the period of heating is generally continued until the viscosity of the cobodied mixture of drying oils attains a value of from about 20 to about 100 poises, the required period of time generally being from about 2 hours to several days, depending on the type of glyceride drying oil, but generally being from about 2 to about 6 hours, especially in the presence of a catalyst, and when utilizing a glyceride containing conjugated unsaturation. Cobodying may be effected either by a simple thermal method whereby the mixture of oils is heated in the absence of any added components or, alternatively, certain catalytic agents which tend to enhance the speed and extent of the polymerization reaction involved in cobodying may be added to the reaction mixture. Typical catalysts utilizable for their accelerating effect on the cobodying reaction include certain acid-acting substances such as the mineral acids, (preferably phosphoric acid), certain Friedel-Crafts type metal halides such as aluminum chloride, iron chloride, zinc chloride, etc., or their addition complexes with certain organic complex-forming compounds such as ethers, alcohols, ketones, etc., and acid-acting solid catalysts, such as the acidic composites of certain hydrous oxides (for example, silica-alumina), or the composite referred to in the art or as a "solid phosphoric acid catalyst," produced by calcining a suitable phosphoric acid (such as pyrophosphoric acid) with a siliceous adsorbent such as kieselguhr. The use of catalysts enables the production of the cobodied drying oils at a lower temperature and in less time than required for simple thermal bodying; the bodied oil, after removal of the catalyst, also tends to be lighter in color than the corresponding thermally bodied drying oil. A further relatively large saving in bodying time may be effected by cobodying the mixture of oils in an evacuated atmosphere, as for example at subatmospheric pressures in the region of about 10 to about 50 mm. of mercury absolute. The drying oils, either individually, before subjecting the same to the cobodying reaction, or a cobodied mixture thereof may be steam or air-blown prior to or following the cobodying reaction to provide a drying oil containing a higher degree of unsaturation and particularly of conjugated unsaturation. The ratio of the respective hydrocarbon and unsaturated fatty acid ester drying oils in the cobodying reaction mixture may be varied over considerable limits but generally, the desired ratio is determined on the basis of the number of unsaturated bonds contained in the molecular structure of the respective drying oils. Hydrocarbon drying oils of the type recovered from conjunct polymerization catalyst sludges generally contain from 2.5 to about 4 double bonds per molecule, while the unsaturated fatty acid ester drying oils generally contain from 1 to about 3 double bonds per molecule. The ratio of drying oils charged to the cobodying reaction, therefore, preferably varies from about 1 to about 3 molecular proportions so that, in general, the total number of unsaturated bonds derived from the hydrocarbon drying oil is maintained approximately equivalent to the number of bonds derived from the fatty acid glyceride drying oil.

The reactant characterized herein as an organic compound containing a carbonyl radical selected from the group consisting of the aldehydes and ketones, which when contacted with the cobodied drying oil mixture at condensation reaction conditions forms the resinous product of this invention, may be selected from the large number of aldehydes and ketones comprising the aliphatic saturated or unsaturated compounds, either of straight- or branched-chain configuration, the aliphatic aldehyde polymers, and the cyclic members of the broad classification of carbonyl compounds, either of heterocyclic or homocyclic structure, including the aromatic, as well as the naphthenic or saturated cyclic series of compounds containing a carbonyl group. Polycarbonyl reactants or a mixture of one or more of aldehydes and/or ketones of the above classes may also be utilized in the present condensation reaction. Typical examples of each of the above classes of aldehydes and ketones are given in the following table, although the compounds named in the table are not to be interpreted as restricting the scope of the invention to the specific members of each series named therein:

TABLE

Carbonyl compounds utilizable as reactants

|  | Aldehydes | Ketones |
| --- | --- | --- |
| Aliphatic: |  |  |
| Saturated | Formaldehyde, butyraldehyde. | Acetone, methylethyl ketone. |
| Unsaturated | Acrolein, crotonaldehyde. | Methyl vinyl ketone, ethylidene acetone. |
| Branched Chain | Isovaleraldehyde | Phorone, mesityl oxide. |
| Aliphatic Polymers | Paraformaldehyde |  |
| Homocyclic: |  |  |
| Naphthenic (cyclic staurated). | Pentahydrobenzaldehyde. | Cyclohexylacetone. |
| Aromatic | Cinnamic aldehyde | Acetophenone. |
| Heterocyclic | Furfural | Cyclohexanone. |
| Polycarbonyl | Glyoxal | Benzoylacetone. |

The condensation reaction of the present process may also be obtained by the reaction of certain substituted derivatives of the carbonyl reactant to provide resinous products having modified properties differing in some respects from the products obtained by the condensation of the simple aldehydes and ketones. Thus, the carbonyl compound may contain as substituents attached to carbon atoms other than the carbonyl group one or more of such radicals as halogen, particularly the chloro and bromo members of this group, hydroxyl, amino, and carboxyl. The substituted derivatives of the simple aldehydes and ketones may be represented structurally by the general formula:

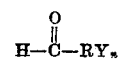

for the aldehydes, in which R is at least a substituted methyl group and is selected from the group of substituted hydrocarbon radicals consisting of alkyl, aryl, alkenyl, aralkyl and naphthene (cycloalkyl), Y is a substituent of said substituted hydrocarbon radicals selected from the group consisting of halogen, hydroxyl, amino, and carboxyl radicals and $n$ is a small whole number equal to at least one. The corresponding structural formula for a substituted simple ketone is:

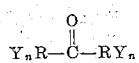

where R, Y and $n$ have the same designation as that specified above for the substituted aldehydes. Generally, it is preferred to utilize carboxyl compounds containing fewer than about 6 carbon atoms per molecule as these have been found to react more completely with the drying oils to yield tougher, and generally harder products.

The condensation reaction of the present process whereby a resinous product varying in properties from viscous liquid materials to elastomeric or hard brittle solids is preferably effected in the presence of a catalytic substance of known capacity for effecting a condensation type of reaction. Among said group of condensation catalysts, the aromatic acids, such as benzoic or the aliphatic acids such as glacial acetic or oxalic acid and various mineral acids, such as hydrochloric, sulfuric and phosphoric acids are among the very effective types of catalyst in initiating or accelerating the condensation reaction of the present process. Certain Friedel-Crafts metal halides, generally the less active members of this class, such as ferric chloride, zinc chloride, zirconium chloride, etc. may likewise be utilized as catalysts. When cobodying of the drying oil mixture is effected in the presence of a catalytic substance as hereinbefore specified, the latter mixture prior to separation of the catalyst therefrom may be charged directly to the condensation reaction where the original catalyst utilized in the cobodying reaction may also be utilized in effecting the condensation reaction.

The catalyst may be subsequently removed from the resinous product by treating the latter with a solvent which selectively dissolves the catalyst from the resin, such as water, alcohols, etc. In some instances, especially in the case of the organic acid catalysts, the latter need not be removed from the condensation reaction mixture but the product containing the catalyst may be utilized as such where the presence of the catalyst will not interfere with the intended use of the product. Generally, the amount of catalyst required for obtaining the catalytic effect is from about 0.1 to about 10 weight percent of the reaction mixture.

Although the condensation reaction here involved is preferably conducted in the presence of a catalyst of the above specified types, it is to be emphasized that catalytic agents are not necessarily required in all instances to effect a given condensation. Thus, when the drying oils utilized in the process are highly unsaturated and the aldehyde or ketone reactant contains unsaturated and/or substituted hydrocarbon radicals attached to the carbonyl group thereof, the condensation reaction proceeds in the absence of a specific catalyst to yield the present product. Catalysts, however, are preferred, since it has been observed that the catalyzed reaction proceeds at a more rapid rate and the product isolated from the reaction mixture is a material possessing more of the desirable properties of products of this type and furthermore possess many of the desired physical properties such as light color, a high degree of elasticity and toughness, etc. In utilizing the relatively reactive unsaturated carbonyl compounds or drying oils as reactants, the condensation reaction may proceed at comparatively low temperatures within the range of from about 25° to about 120° C. by merely mixing the components in the presence of the catalyzing agent; in the case of other reactants, a greater quantity of catalyst may be added to the reaction mixture to initiate or promote the condensation reaction and the temperature may also be increased to somewhat higher values, up to about 200° C. The preferred temperature range in which condensation is obtained and which yields the desired product within a reasonable period of reaction and without discoloration of the final product, is from about 50° to about 150° C. Under these conditions, the reaction is generally complete within a period of from about ½ to about 6 hours, although the product increases in hardness and approaches the properties of typical resins as the reaction is allowed to continue for more extended periods.

The reaction may also be effected in the presence of a suitable solvent which is miscible with the reactants and/or the resultant product. Typical solvents, for example, include the halogen substituted hydrocarbons, such as chloroform, etc., and the lower alcohols, esters and ethers such as ethanol, butanol, ethylacetate, Cellosolve, diethylether, diisopropylether, etc. The solvent and catalyst functions may be combined in a single compound such as acetic acid, oxalic acid, etc. In many cases it is desirable to employ the solvent as a diluent of the reactants so as to control the rate of reaction or the temperature developed in the reaction mixture, for example, by refluxing the solvent. If desired, a solvent which forms an azeotrope with the water of condensation may be added to the reaction mixture in which case the solvent may be distilled from the mixture during the condensation reaction by forming an azeotrope therewith. When such precautions are taken, the product usually possesses a more desirable color and other physical properties such as hardness, elasticity, etc. may be improved.

After completion of the initial condensation reaction and the separation of product from the reaction mixture, the product, if in the form of a solid material may be pulverized and utilized in a finely divided condition for subsequent molding operations, or compounded into protective coating compositions. The resinous product formed in the initial reaction may be further reacted with additional quantities of either the same or a different carbonyl compound than the aldehyde or ketone employed in the initial reaction to form thereby a fully reacted condensation product which is usually harder, tougher and more refractory than the initial partially condensed product. In general, utilization of an excess of the cobodied drying oil mixture, for example, a molecular ratio thereof to the carbonyl reactant greater than about 3:1, results in the production of softer resinous products. As the proportion of carbonyl compound to cobodied drying oil increases in the reaction mixture the resulting product tends to be progressively harder and tougher until an equimolecular ratio of reactants is charged to the reaction. Thus, an initial condensation reaction product in which the carbonyl compound was less than a 1:1 molar ratio may be subsequently modified in physical properties by further incorporating in the initial product additional carbonyl compounds and thereafter reacting the latter mixture to form the modified product.

The present condensation products formed according to the process of this invention are usually elastomeric resinous materials varying in hardness from soft pliable masses to hard solids which may be tough or brittle depending upon the reactants. The product may merely be a modified cobodied drying oil when the proportion of carbonyl compound to cobodied drying oil reactant is much less than a 1:1 molar ratio of the reactants. Thus, the drying speed of the cobodied drying oils may be reduced or the properties of the film obtained upon drying a film of the drying oils are modified by reacting generally less than about 0.1 molecular proportion of the carbonyl reactant with the cobodied mixture of drying oils. In such cases, catalysts are also eliminated from the condensation reaction mixture.

The products of the present process have a widespread utility in various arts depending upon their physical properties. Since resinous products may be prepared having unsaturated linkages in their molecular structure, the latter may be incorporated into drying oils and as such are also subject to polymerization and oxidation reactions which take place during the so-called "drying process." When compounded with either the cobodied drying oils or an individual ester or hydrocarbon type, the products provide valuable film-forming and bodying properties to paints and varnishes in which the resins are incorporated. Paint and varnish formulations obtained by mixing the present product with a drying oil and other components, if desired, dry quickly and completely and yield a tough glossy surface resistant to chemicals, water and abrasive agents and such films are also quite elastic when subjected to flexure.

The following examples are presented for the purpose of illustrating the present process in some of its specific applications, but should not be construed as restricting the generally broad scope of the invention, either as to the reacting components or the reaction conditions.

EXAMPLE I

A synthetic hydrocarbon drying oil containing a mixture of conjunct hydrocarbon polymers comprising polyolefinic cyclic hydrocarbons was prepared by the following reaction.

22 liters (16.5 kg.) of non-selective copolymers having a bromine, number of 162 (polymers of mixed butylenes and propylene referred to as a polymer gasoline) consisting predominantly of mono-olefinic hydrocarbons containing from about 8 to about 12 carbon atoms per molecule was charged into an autoclave and rapidly stirred as 9.0 kg. of liquid anhydrous hydrogen fluoride was introduced into the reactor. The pressure was maintained throughout the reaction at an average value of about 205 pounds per square inch by means of compressed nitrogen. The temperature was increased to 91° C. and stirring was continued for an additional hour. The reaction mixture separated into two phases on standing: an upper saturated hydrocarbon layer (bromine number=10) and a lower acidic layer. The upper layer, after washing with aqueous caustic to remove a small amount of dissolved hydrogen fluoride, weighed 8.1 kg.

The lower acidic sludge layer weighed 16.1 kg. after removal of entrained "upper layer" by extracting the latter with liquid pentane and was a light brown mobile fluid having a density of 0.98 at 4° C. Its yield, based on the total charge, was 63 percent.

100 g. of the above hydrogen fluoride sludge was allowed to flow into a mixture of ice and water, additional ice being added as the heat of the hydrolysis reaction melted the ice. 43.4 g. of a light-colored, sweet-smelling oil separated from the aqueous phase, a yield of 42.2% based on the original olefin charged and 43.4% based on the weight of sludge hydrolyzed. An examination of the oil indicated the following properties:

Boiling range _____ 160° to above 400° C.
Density, $d_4^{20}$ _____ 1.4871
Refractive index, $n_D^{20}$ _____ 0.863
Color, Gardner _____ 12–13
Molecular weight, average __ 263
Diene number _____ 85
Bromine number _____ 195
Specific dispersion _____ 143
Percent fluorine _____ 0.06
Double bonds/molecule (average) _____ 3.2

Although the hydrocarbon drying oil as prepared above was obtained from a hydrogen fluoride sludge and was recovered therefrom by an aqueous hydrolysis procedure, a somewhat similar material may be obtained from an aluminum chloride or sulfuric acid sludge, and the conjunct hydrocarbon polymers comprising said drying oil may be also recovered from the hydrogen fluoride sludge by distilling off the hydrogen fluoride.

The mixture of drying oil hydrocarbons recovered from the hydrogen fluoride sludge was cobodied with linseed oil in accordance with the following procedure:

A reaction mixture consisting of one volume of hydrocarbon drying oil and three volumes of alkali refined linseed oil was heated in the absence of air at 300° C. for approximately five hours, the mixture having a viscosity of about 35 poises.

The cobodied drying oil mixture was cooled, admixed with a molar equivalent of trioxymethylene (where the cobodied drying oil mixture had an approximate molecular weight of 495, as determined cryoscopically) and 0.1% by weight of the reaction mixture of oxalic acid which acted as a catalyst for the reaction. The mixture was heated at 90° C. for two hours, forming a pliable, elastomeric solid mass which readily dissolved in toluene and the individual or cobodied drying oils heretofore specified. A mixture of drying oils and the condensation product prepared as indicated when spread in a thin film and exposed to the atmosphere dries to a tough, hard, elastic film.

EXAMPLE II

The cobodied mixture of drying oils as prepared in Example I will undergo condensation with isophorone to yield a rubber-like product. A mixture of 2 molecular proportions of isophorone and cobodied drying oils admixed with about 2 weight percent of ferric chloride and reacted at 100° C. for 2½ hours forms the indicated product; a brown, non-sticky product soluble in hydrocarbon solvents and drying oils.

I claim as my invention:

1. A process for the production of resinous and elastomeric materials which comprises cobodying from about 1 to about 3 molecular proportions of an unsaturated fatty acid ester drying oil and 1 molecular proportion of a hydrocarbon drying oil containing polyolefinic unsaturation in which at least some of the unsaturated bonds are in conjugated relationship, and thereafter reacting said cobodied mixture of drying oils with a carbonyl compound selected from the group consisting of the aldehydes and ketones at condensation reaction conditions and in the ratio of said carbonyl compound to said cobodied mixture of from about 0.1 to about 3 molecular proportions.

2. The process of claim 1 further characterized in that said reaction of the cobodied mixture of drying oils and carbonyl compound is effected at a temperature of from about 25° to about 200° C.

3. The process of claim 1 further characterized in that said reaction of the cobodied mixture of drying oils and carbonyl compound is effected in the presence of an acidic condensation catalyst.

4. A process for the production of resinous and elastomeric materials which comprises cobodying from about 1 to about 3 molecular proportions of an unsaturated fatty acid glyceride drying oil and 1 molecular proportion of an unsaturated hydrogen drying oil containing from about 2.5 to about 4 double bonds per molecule to form a cobodied mixture thereof having a viscosity of from about 25 to about 150 poises and condensing said cobodied mixture of drying oils with formaldehyde utilizing a molecular ratio of cobodied drying oils to formaldehyde of from about 1 to about 3, at a temperature of from about 50° to about 120° C. and in the presence of an organic acid condensation catalyst.

5. The process of claim 1 further characterized in that said hydrocarbon drying oil comprises a mixture of polyolefinic cyclic hydrocarbons containing from about 2.5 to about 4 double bonds per molecule.

6. As a composition of matter, the condensation product of from about 0.1 to about 3 molecular proportions of a carbonyl compound selected from the group consisting of the aldehydes and ketones with 1 molecular proportion of a cobodied mixture of from about 1 to about 3 molecular proportions of an unsaturated fatty acid ester drying oil and 1 molecular proportion of a hydrocarbon drying oil containing polyolefinic unsaturation in which at least some of the unsaturated bonds are in conjugated relationship.

7. The process of claim 1 further characterized in that said carbonyl compound is a saturated carbonyl compound.

8. The process of claim 1 further characterized in that said carbonyl compound is formaldehyde.

9. The process of claim 1 further characterized in that said carbonyl compound is a formaldehyde polymer.

10. The process of claim 1 further characterized in that said carbonyl compound is an olefinic carbonyl compound.

11. The process of claim 1 further characterized in that said carbonyl compound is formaldehyde and said unsaturated fatty acid ester drying oil is linseed oil.

12. The process of claim 1 further characterized in that said carbonyl compound is trioxymethylene.

13. The condensation product of claim 6 further characterized in that said carbonyl compound is trioxymethylene and said unsaturated fatty acid ester drying oil is linseed oil.

EDWARD M. GEISER.

REFERENCES CITED

The following references are of record in the file of this patent:

UNITED STATES PATENTS

| Number | Name | Date |
|---|---|---|
| 2,382,184 | Thompson | Aug. 14, 1945 |